Feb. 12, 1957  I. A. GREENWOOD, JR  2,781,168
GREAT CIRCLE COMPUTER
Filed Sept. 15, 1955  2 Sheets-Sheet 2

INVENTOR.
IVAN A. GREENWOOD, JR.
BY
ATTORNEY

United States Patent Office 2,781,168
Patented Feb. 12, 1957

2,781,168

GREAT CIRCLE COMPUTER

Ivan A. Greenwood, Jr., Stamford, Conn., assignor to General Precision Laboratory Incorporated, a corporation of New York Application September 15, 1955, Serial No. 534,578

9 Claims. (Cl. 235—61)

This invention pertains to a computer for solving spherical triangles and is particularly useful in navigating any vehicle relative to the earth's surface. In such instances the computer is utilized to determine the course angle for following a great circle route and the distance to destination.

A basic problem in navigation involves the computation of the great circle course between two points on the earth's surface. Such a course follows the shortest path between the two points but in following it the course angle continuously changes. In the case of ocean vessel navigation the course angle is frequently recomputed and reset; the course is then a series of chords joining the various points on the approximate path of the great circle route. In the case of air navigation recomputation and resetting of the course must be more frequent because of the greater speed, and it is highly preferable to make automatic and continuous recomputations.

The computer of the present invention solves automatically for both course angle and distance to destination so that if continuously corrected data are presented to the computer the output of course and distance to destination will be continuously indicated. The initial input data for this computer consists of the latitudes and longitudes of the destination and of the starting point. When the position of the destination is fixed the only data to be furnished to the instrument during the journey are the continuous changes in the instant latitude and longitude of the vehicle. However, should the destination be altered after the vehicle has left the original fixed point of departure the present invention is capable of responding to new input data consisting of the latitude and longitude of the new destination, therefrom computing a new great circle route from the instant position of the vehicle to the new destination. In other words, when data are set into the device corresponding to two points on the earth's surface, one of which is the present position of the vehicle, the device will instantly compute the course angle for the great circle route to the destination and the exact distance to be travelled.

The device will continue to recompute these quantities so that the dials showing them are kept accurate and up to date from instant to instant.

A difficulty which has been encountered in devices of this nature and which has not been overcome so far as known, is that these devices require a multiplicity of components each of which has instrument error so that in the aggregate a considerable error may accrue in the course angle and in the computed distance to destination.

These instrument errors are of course systematic for any particular instrument and result in a specific error for any specific set of input data, so that the journey is terminated at a point several miles distant from the planned destination.

The present invention on the contrary embraces a basic philosophy which causes its instrument errors to be self-effacing with time so that as the destination is neared the instrument errors tend to vanish and at the destination do vanish completely. Thus a vehicle equipped in accordance with this invention homes on its destination with complete elimination of all instrument error.

The manner of securing the input data is outside of the scope of this invention. They may be secured by frequent or continuous celestial observation, by manual or automatic dead reckoning means based on compass and ground speed data, by radar or other electronic navigation aids or in any other way.

In the instant invention, representations of latitude and longitude constituting the current input data are continuously presented to the computer in the form of mechanical shaft displacements. By means of components which resolve, multiply, add, subtract and solve triangles, two output shafts are continuously repositioned, one representing the course to be steered in terms of azimuth angle and the other representing the distance remaining to destination by great circle route.

The general purpose of this invention then is to provide a great circle navigation computer for continuously indicating the course and great circle distance to destination.

The particular purpose of this invention is to provide such a computer in which the instrument error grows less as the objective is approached and completely vanishes as the objective is reached.

A further understanding of this invention may be secured from the detailed description and accompanying drawings, in which.

It has been discovered that when the following two equations are used as basis for construction of a great circle computer, the instrument error continuously grows less and becomes zero at destination.

$$\sin D \sin C_A = \cos L_B \sin L_O \qquad (1)$$

$$\sin D \cos C_A = \sin L + \cos L_B \sin L_A (1 - \cos L_O) \qquad (2)$$

Figure 1:
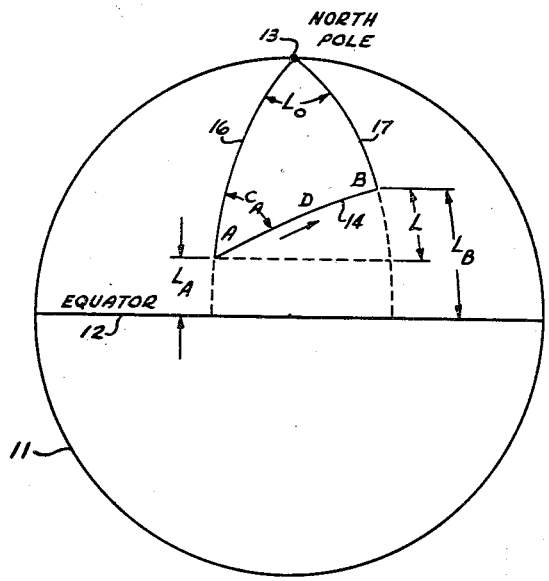
Figure 1 represents a spherical triangle drawn on the surface of the earth, for use in explaining the navigational equations underlying the theory of this invention.

These two trigonometric identities describe properties of spherical triangles and are derived from the laws of sines and cosines by trigonometric manipulation. They are applied to a spherical triangle for use in navigation as shown in Fig. 1, in which the circle 11 represents the earth, with the Equator at 12 and the North Pole at 13. A and B represent any two points on the earth's surface, A being the start of a navigational path or the present position of a navigated vehicle, and B the termination of the path.

Navigation is to be executed by the great circle method, resulting in the theoretically shortest route. This route is indicated at 14 and has a length in units of arc termed D. The meridians through A and B are designated 16 and 17 and these meridians together with the great circle path 14 form a spherical triangle drawn on the earth's surface having as apices the North Pole and points A and B. The longitude of A and B are $L_{OA}$ and $L_{OB}$, respectively, and the longitude difference is $L_O$, or $$L_{OA} - L_{OB} = L_O \qquad (3)$$

The latitudes of A and B are $L_A$ and $L_B$, respectively, and their latitude difference is L, or $$L_A - L_B = L \qquad (4)$$

The angle between the sides 14 and 16 of the spherical triangle is designated $C_A$ and is the course angle at A in terms of azimuth degrees.

Figure 2:
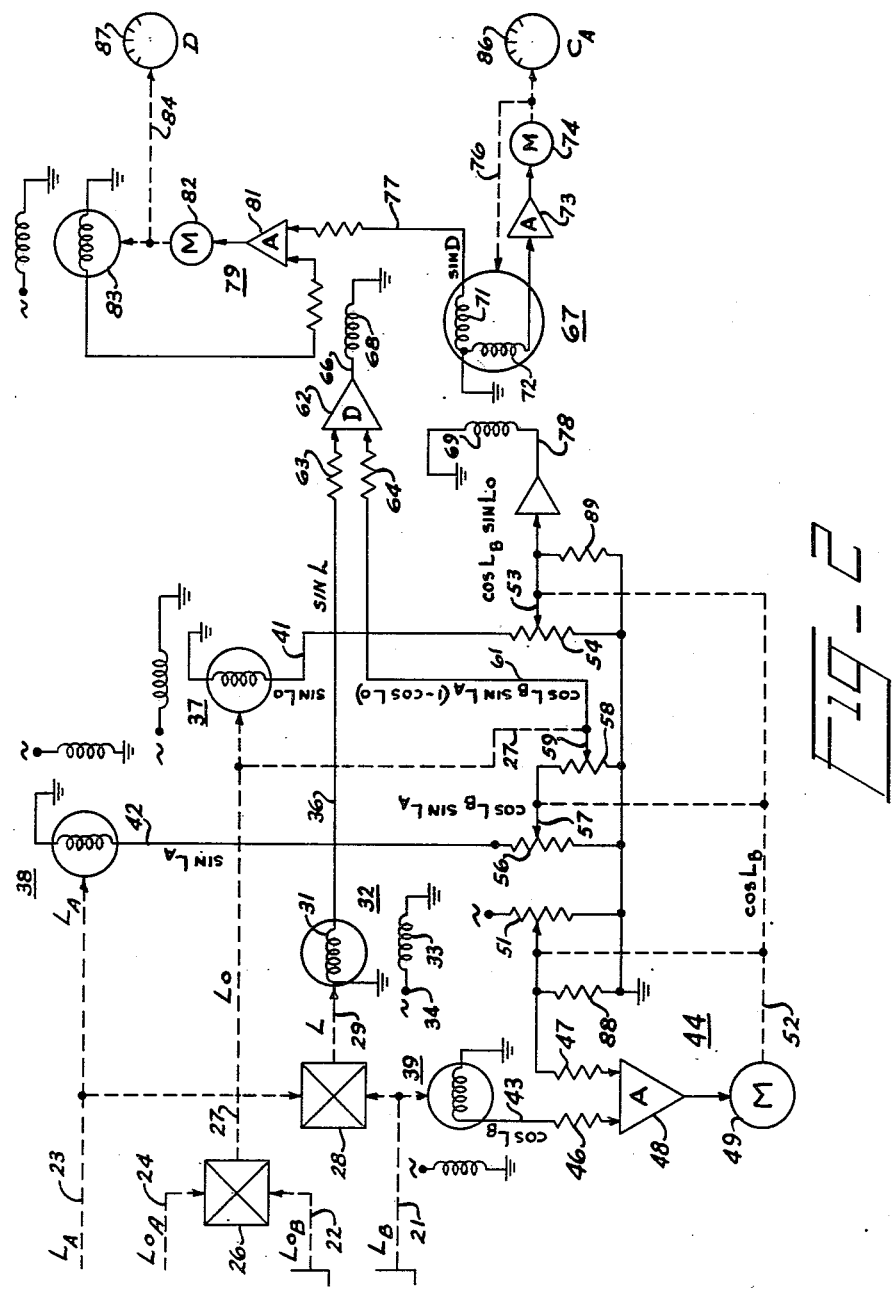
Figure 2 is a schematic drawing of the circuit of an instrument embodying this invention.

Referring now to Fig. 2, the latitude $L_B$ and longitude $L_{OB}$ of the destination are set into the instrument by shafts 21 and 22 respectively. Starting position or present position data in terms of latitude $L_A$ and longitude $L_{OA}$ are supplied to the instrument through shafts 23 and 24 respectively, the angular displacements of these shafts representing the magnitudes of these quantities in angular terms. The longitudes $L_{OA}$ and $L_{OB}$ are subtracted in device 26, which may for example be a spur gear differential, to form the longitude difference angle $Lo$ at shaft 27. Similarly, the latitudes $L_A$ and $L_B$ are subtracted in device 28 to form the latitude difference angle $L$ at shaft 29. This permits the differences to be formed to high degrees of accuracy, even though the input data contain systematic errors.

The four quantities $L$, $Lo$, $L_A$ and $L_B$ are now separately and trigonometrically resolved into their sine or cosine functions by synchro resolvers of conventional form. For example, the shaft 29, representing by its angular displacement the latitude difference angle $L$, is connected to the rotor winding 31 of a synchro resolver 32. A stator winding 33 is excited by alternating current applied at terminal 34 so that the output potential at conductor 36 is related to the stator potential in terms of the sine or cosine, in this case the sine, of the rotor angle. The potential of conductor 36 therefore is representative of $\sin L$.

In similar manner the synchro resolvers 37, 38 and 39 have outputs at conductors 41, 42 and 43 representing by their potential magnitudes $\sin Lo$, $\sin L_A$, and $\cos L_B$, respectively.

The output conductor 43 bearing a potential representing $\cos L_B$ is connected to a position servomechanism 44 of conventional form comprising subtracting resistors 46 and 47, amplifier 48, motor 49, and linear voltage divider 51. By means of this servomechanism the potential of conductor 43 is represented by the angular displacement of an output shaft 52. This shaft displacement thus is proportional to and represents $\cos L_B$.

This shaft displacement is applied to displace the slider 53 of a linear voltage divider 54, the divider being connected to conductor 41. The electrical output at slider 53 is therefore the product of the voltage divider excitation, $\sin Lo$, and its slider position, $\cos L_B$, and thus represents the term $\cos L_B \sin Lo$. This term is identical with the right side of Equation 1.

In similar manner a linear voltage divider 56 is connected to conductor 42 for excitation by a potential equal to $\sin L_A$, and the slider 57 is connected for positioning by shaft 52 in accordance with the function $\cos L_B$. The slider potential then represents the product or $\cos L_B \sin L_A$.

A non-linear voltage divider 58 is designed to produce an output voltage $y$ having the form $$y = E(1 - \cos L_o) = 2E \sin^2 \frac{L_o}{2} \quad (5)$$

when electrically excited by a voltage $E$ and mechanically moved in accordance with the quantity $Lo$. Since it is actually electrically excited by a quantity representing $\cos L_B \sin L_A$, Equation 5 becomes:

$$y = \cos L_B \sin L_A (1 - \cos Lo) \quad (6)$$

This quantity is represented by the output potential at conductor 61 connected to the voltage divider slider 59. This quantity is identical with the last term of Equation 2. It is essential that this function can actually go to zero as instrumented, therefore the divider 58 should be adjusted to have zero output when the $Lo$ input is zero.

The terms $\sin L$ represented by the potential of conductor 36, and $\cos L_B \sin L_A (1 - \cos Lo)$ represented by the potential of conductor 61 connected to slider 59, are added in an adding device comprising driver amplifier 62 and input network resistors 63 and 64, so that the voltage output at conductor 66 represents the sum term $\sin L + \cos L_B \sin L_A (1 - \cos Lo)$. This term is identical with the right side of Equation 2.

The device 67 is a conventional arc tangent solver having the function of solving for $M$ and $N$ in the equations:

$$M \sin N = e_1 \quad (7)$$

$$M \cos N = e_2 \quad (8)$$

when $e_1$ and $e_2$ are applied as input data. Its operation is well understood in the art. It contains a double resolver having input stator coils 68 and 69 and output rotor coils 71 and 72. Coil 72 is connected through servo amplifier 73 and motor 74 to position the rotor shaft 76 to the null position of winding 72. The angle of shaft 76 will then represent the angle $N$ and the potential output of conductor 77 will represent $M$. The left sides of Equations 7 and 8 are in the same form as those of Equations 1 and 2, so that if $$M = \sin D \quad (9)$$

and $$N = C_A \quad (10)$$

then $$e_1 = \cos L_B \sin Lo \quad (11)$$

and $$e_2 = \sin L + \cos L_B \sin L_A (1 - \cos Lo) \quad (12)$$

Since these quantities equal to $e_1$ and $e_2$ are applied through conductors 66 and 78 to input stator windings 68 and 69, it follows that the output shaft 76 is positioned in accordance with the angle $C_A$ and the output conductor 77 bears a potential whose value is representative of $\sin D$.

The potential representing $\sin D$ is converted into a shaft displacement representing $D$ by means of a conventional position servomechanism 79 comprising an adding servo amplifier 81, motor 82, and synchro resolver 83. The shaft 84 of the synchro resolver 83 is positioned in accordance with the angular measure of $D$.

The shafts 76 and 84, representing by their angular deflections the quantities $C_A$ and $D$, are connected to dials 86 and 87, from which these quantities may be read at any time and the vehicle navigated in accordance with them.

It is obvious that for the purpose of steering the vehicle the angle $C_A$ only is necessary and the quantity $D$ is not needed. For this purpose, therefore, the dial 87 and position servomechanism 79 can be omitted. However, the quantity $D$ is generally necessary because it indicates arrival at the destination, so that, for a self-contained navigation system not relying on visual or other aids for this information, $D$ is as necessary as the quantity $C_A$ in navigation to and not beyond an exact destination point $B$. In addition, $D$ is useful during the journey in predicting time of arrival at destination.

The resistors 88 and 89 are used to match the resistance of voltage divider 58. Since the latter is bridged to the slider 57 of voltage divider 56, it destroys the linearity of divider 56 and results in a curved characteristic at slider 57. When matching curved characteristics are given to the dividers 51 and 54 by means of the resistors 88 and 89, inaccuracy due to this cause is eliminated.

The instrument of this invention has complete absence of instrument error at the destination because each instrumented term reduces to zero at the destination and because all instrument errors are adjusted to neutralization at the destination. That is, reliance is not placed on subtraction of two large terms which at destination are equal except for their contained instrument errors, which in general will, of course, not be equal and will not cancel each other. Referring to the instrumented right-hand sides of Equations 1 and 2, $\cos L_B \sin Lo$ becomes zero at destination because $Lo$ is zero; $\sin L$ becomes zero because $L$ is zero; and $\cos L_B \sin L_A (1 - \cos Lo)$ becomes zero because the parenthetical term is zero when $Lo$ is zero.

Instrument errors are adjusted to neutralization in the following manner. Let the error of the output of servo 44 be $+k$, so that for a selected value of $L_B$ the output is $\cos L_B + k$. Similarly, let the error of the output of synchro 37 be $m$, so that at a selected value of $Lo$ the output is sin $L_O+m$. However, $m$ is reduced to zero at destination by adjustment of 37 with an input $L_O=0$. Let the error added by voltage divider 54 at a selected input be $n$. Its output will then be $$(\cos L_B + k) \sin L_O + n \quad (11)$$

and when $L_O$ is zero the first term vanishes. The voltage divider 54 is now adjusted so that when $L_O$ is zero, the divider output is zero, thus making $n$ equal to zero at this specific point. As the result, the function $\cos L_B \sin L_O$ fed through conductor 78 from slider 53 to winding 69 of arc tangent solver 67 may include instrument errors while approaching the destination, but when near to the destination these errors will be small and at the destination there will be no error and the term $\cos L_B \sin L_O$ will be precisely zero.

A similar procedure is followed in the elimination of error in instrumentation of the right side of Equation 2.

Let the error in resolver 32 be termed $p$, so that its output in general is not $\sin L$, but $\sin L+p$. This resolver is now adjusted so that, when $L=0$, $p=0$. This eliminates all error in the output of resolver 32 at destination.

As respects the second term of Equation 2, $\cos L_B \sin L_A (1-\cos L_O)$, if fortuitous instrument errors added at a selected value to the outputs of servo mechanism 44, resolver 38, and dividers 56 and 58 are $k$, $q$, $r$ and $s$, respectively, the voltage output in conductor 61 will be $$\cos L_B \sin L_A (1-\cos L_O) + (1-\cos L_O) [f (\cos L_B, \sin L_A, kq, r)] + s [f (\cos L_B, \sin L_A, kq, r)] \quad (12)$$

However, the versed sine $(1-\cos L_O)$ approaches zero much more rapidly than $L_O$ or $L$, as the destination is neared, so that the first two terms of this expression are small and the second or error term can be neglected as undetectible in practice. The third term is made to vanish by adjusting inputs to make $L_O$ zero, then adjusting the voltage divider 58 to make its output zero under this condition. This has the effect of giving $s$ such value as to neutralize $kq$ and $r$. The term $\cos L_B \sin L_A (1-\cos L_O)$ is thus made to have little or no error added to it at destination, and since its magnitude near destination is only a very small fraction of the magnitude of the other term of Equation 2, i. e., $\sin L$, the error is completely negligible.

The instrumentation depicted in Fig. 2 indicates connections at several points to a source of electrical power. Fluctuations in line voltage of this source are, however, so balanced as to have no effect upon the output data accuracy because in effect line voltage variations appear on both sides of an equation, or in both numerator and denominator of a fraction.

This instrument thus provides indications of its two output dials of the quantities D and $L_A$ which do not contain input data errors because these errors cancel in the difference terms $L_{OA}-L_{OB}$ and $L_A-L_B$. Additionally instrument errors vanish at destination and are increasingly minimized during the journey.

What is claimed is:

1. A course angle computer for the great circle navigation of a vehicle from any present position to a predetermined destination comprising, means for introducing latitudes and longitudes of present position and destination, first means adapted for reception of present latitude and destination latitude data having an output representative of the sine of the latitude difference, second means adapted for reception of present position and destination latitude and longitude data to produce an output representative of the cosine of destination latitude multiplied by sine of present latitude multiplied by the versed sine of longitude difference, third means adapted for reception of destination latitude and longitude and present position longitude to produce an output representative of the product of the cosine of destination latitude and the sine of the longitude difference, summation means for adding the outputs of said first and second means, and arc tangent means actuated by said summation means and said third means to produce a shaft angle equal to said course angle.

2. A course angle computer in accordance with claim 1 including an arc tangent means electrical output representing the sine of the present distance between present position and destination.

3. A course angle and distance to destination computer in accordance with claim 2 including arc sine resolver means connected for actuation by said arc tangent means electrical output to form an output representing the distance between present position and destination.

4. A course angle computer for the great circle navigation of a vehicle from any present position to a predetermined destination comprising, input means for introducing the latitudes and longitudes of present position and destination, first subtracting means for subtracting said latitudes to produce a latitude difference indication, second subtracting means for subtracting said longitudes to produce a longitude difference indication, servo means actuated by said destination latitude input for deflecting a shaft in accordance with the cosine of destination latitude, first resolving means actuated by said latitude subtracting means for producing a signal representative of the sine of the latitude difference, second resolving means actuated by said present latitude input for producing a signal representative of the sine of present latitude, third resolving means actuated by said longitude subtracting means for producing a signal representative of the sine of the longitude difference, first multiplying means actuated by said servo means and said second resolving means to produce a signal representative of the product of the cosine of destination latitude and the sine of present latitude, second non-linear multiplying means actuated by said second subtracting means and said first multiplying means to produce a signal representative of the product of the cosine of destination latitude, sine of the present latitude and the versed sine of longitude difference, third multiplying means actuated by said third resolving means and said servo means to produce a signal representative of the product of the cosine of destination latitude and the sine of the longitude difference as a first component voltage, adding means connected to said first resolving means and second non-linear multiplying means to form a second component voltage, and vector adding means connected to said third multiplying means and said adding means to form the vector sum angle of said first and second component voltages, said vector sum angle therefore being said course angle.

5. A course angle computer in accordance with claim 4 in which said vector adding means includes a voltage output representative of the magnitude of said vector sum and therefore representative of the sine of the distance between present position and destination.

6. A course angle computer in accordance with claim 5 including servomechanism arc sine means connected to said vector adding means having a mechanical shaft deflection output representative of the magnitude of the arc sine of said vector sum and therefore representative of the distance between present position and destination.

7. A computer for electrically computing the great circle course angle for navigating a vehicle from any present position to a predetermined destination comprising, a latitude subtracting differential having two input shafts angularly adjusted to present latitude and destination latitude and having an output shaft, a longitude subtracting differential having two input shafts angularly adjusted to present longitude and destination longitude and having an output shaft, a first synchro resolver having its shaft angularly adjusted to destination latitude generating an electrical output quantity representative of the cosine of destination latitude, a servomechanism connected to said first synchro resolver having a shaft output representative of the cosine of destination latitude, a second synchro resolver having its shaft connected for actuation by the output shaft of the latitude subtracting differential generating an electrical output quantity representative of the sine of the latitude difference, a third synchro resolver having its shaft angularly adjusted to present latitude to generate an electrical output quantity representative of the sine of present latitude, a fourth synchro resolver having its shaft connected for actuation by the output shaft of the longitude subtracting differential to generate an electrical output quantity representative of the sine of the longitude difference, a first linear voltage divider electrically energized by the output of said third synchro resolver and mechanically connected for slider actuation by the shaft output of said servomechanism and having an electrical slider output, a second non-linear voltage divider connected for electrical energization by the output of said first voltage divider and mechanically connected for slider actuation by the output shaft of said longitude subtracting differential and having an electrical slider output, a third linear voltage divider electrically connected for energization by the output of said fourth synchro resolver and mechanically connected for slider actuation by the shaft output of said servomechanism and having an electrical slider output, an adding device connected for energization by the outputs of said second synchro resolver and of said second non-linear voltage divider to form an electrical output representing the sum thereof, and an arc tangent solver connected for actuation by the output voltages of said adding device and of said third linear voltage divider and having a shaft output angle whose tangent is the ratio of said two actuating voltages, said shaft output angle therefore being said great circle course angle.

8. A computer in accordance with claim 7 in which said arc tangent solver has an electrical output representing the vector sum of said two actuating voltages and numerically equal to the sine of the distance between said present position and said predetermined destination.

9. A computer in accordance with claim 8 including a second servomechanism connected for actuation by the electrical output of said arc tangent solver and having a mechanical shaft output deflection numerically representing the distance between said present position and said predetermined destination.

References Cited in the file of this patent
UNITED STATES PATENTS 2,688,440    Gray et al. _____ Sept. 7, 1954